US008484356B1

(12) United States Patent
Douglis et al.

(10) Patent No.: US 8,484,356 B1
(45) Date of Patent: Jul. 9, 2013

(54) SYSTEM AND METHOD FOR ALLOCATING A STORAGE UNIT FOR BACKUP IN A STORAGE SYSTEM WITH LOAD BALANCING

(75) Inventors: Frederick Douglis, Basking Ridge, NJ (US); R. Hugo Patterson, Los Altos, CA (US); Philip N. Shilane, Yardley, PA (US)

(73) Assignee: EMC Corporation, Hopkinton, MA (US)

( * ) Notice: Subject to any disclaimer, the term of this patent is extended or adjusted under 35 U.S.C. 154(b) by 98 days.

(21) Appl. No.: 13/172,687

(22) Filed: Jun. 29, 2011

Related U.S. Application Data

(60) Provisional application No. 61/494,768, filed on Jun. 8, 2011.

(51) Int. Cl.
*G06F 13/00* (2006.01)
(52) U.S. Cl.
USPC .......................... 709/226; 709/214; 709/215
(58) Field of Classification Search
USPC ................. 709/213, 214, 215, 223, 224, 226
See application file for complete search history.

(56) References Cited

U.S. PATENT DOCUMENTS

| 2012/0173822 | A1* | 7/2012 | Testardi et al. | 711/135 |
|---|---|---|---|---|
| 2012/0226936 | A1* | 9/2012 | Prabhakaran et al. | 714/6.23 |
| 2012/0290546 | A1* | 11/2012 | Smith et al. | 707/700 |

OTHER PUBLICATIONS

Chapin, S. J., "Distributed and Multiprocessor Scheduling," ACM Comput. Surv. 28, Mar. 1996, http://doi.acm.org/10.1145/234313.234410, 32 pages.
Dong, W., et al., "Tradeoffs in Scalable Data Routing for Deduplication Clusters," Proceedings of the $9^{th}$ USENIX Conference on File and Storage Technologies, FAST'11, USENIX Association, 2011.
"EMC Networker and EMC Data Domain Boost, Best Practices Planning," EMC Corporation, Hopkinton, MA, US, Nov. 2010, 24 pages, http://www.datadomain.com/products/dd-boost.html.
da Silva, James et al., "The Amanda Network Backup Manager," USENIX (ed.) Proceedings of the Seventh Systems Administration Conference, LISA VII, Nov. 1-5, 1993, Monterey, CA, US, pp. 171-182.
Gmach, Daniel et al., "Capacity Management and Demand Prediction for Next Generation Data Centers," IEEE International conference on Web Services, 2007, 8 pages.
Harchol-Balter, Mor et al., "Exploiting Process Lifetime Distributions for Dynamic Load Balancing," ACM Trans. Comput. Syst. 15, 253-285, Aug. 1997, http://doi.acm.org/10.1145/263326.263344, 31 pages.

(Continued)

*Primary Examiner* — Viet Vu
(74) *Attorney, Agent, or Firm* — Blakely Sokoloff Taylor & Zafman LLP

(57) ABSTRACT

A request for allocating a storage unit of a storage system is received to back up data of one or more clients. The storage system includes multiple storage units and each storage unit storing data that is deduplicated within each storage unit. In response to the request, one or more of the storage units are selected based on an amount of deduplicated data that would be stored in each of the storage units after storing the data of the one or more clients. The selected one or more storage units are allocated to the one or more clients to back up the data of the one or more clients.

28 Claims, 9 Drawing Sheets

OTHER PUBLICATIONS

Meyer, Dutch T. et al., "A Study of Practical Deduplication," Proceedings of the 9th USENIX conference on file and Storage Technologies, FAST'11, USENIX Association, 2011, 13 pages.

"Unified Backup and Recovery with EMC NetWorker, A Detailed Review," EMC Corporation, Hopkinton, MA, US, Feb. 2011, 16 pages, http://www.emc.com/collateral/software/white-papers/h3399_nw_bu_rec_wp.pdf.

Milojicic, Dejan S. et al., "Process Migration," ACM Comput. Surv. 32, 241-299, Sep. 2000, http://doi.acm.org/10.1145/367701.367728.

Quinlan, Sean et al., "Venti: a new approach to archival storage," FAST'02, Proceedings of the 1st USENIX conference on File and Storage Technologies, Jan. 2002, 14 pages.

da Silva, James, et al., "Performance of a Parallel Network Backup Manager," USENIX (ed.) Proceedings of the Summer 1992 USENIX conference, Jun. 8-12, San Antonio, Texas, US, pp. 217-226.

Soundararajan, Vijayaraghavan, et al., "Challenges in Building a Scalable Virtualized Datacenter Management," SIGOPS Oper. Syst. Rev. 44, 95-102, Dec. 2010.

Dewaikar, Mayur "Next Generation Data Protection with Symantec NetBackup 7," Symantec Corporation, Mountain View, CA, US, 2011, http://eval.symantec.com/mktginfo/enterprise/white_papers/b-next_generation_data_protection_with_sym_nbu7_WP_20999878.en-us.pdf, 13 pages.

"Managing the tidal wave of data with IBM Tivoli storage management solutions," IBM Corporation, Somers, NY, US, Jun. 2009, http://www-01.ibm.com/software/tivoli/products/storage-mgr/, 12 pages.

Zhang, Xiambo et al., "HPTFS: A High Performance Tape File System," Proceedings fo 14th NASA Goddard/23rd IEEE conference on Mass Storage System and Technologies, 2006, 11 pages.

Zhu, Benjamin et al., "Avoiding the Disk Bottleneck in the Data Domain Deduplication File System," FAST'08, Proceedings of the 6th conference on File and Storage Technologies, Feb. 2008, pp. 269-282.

\* cited by examiner

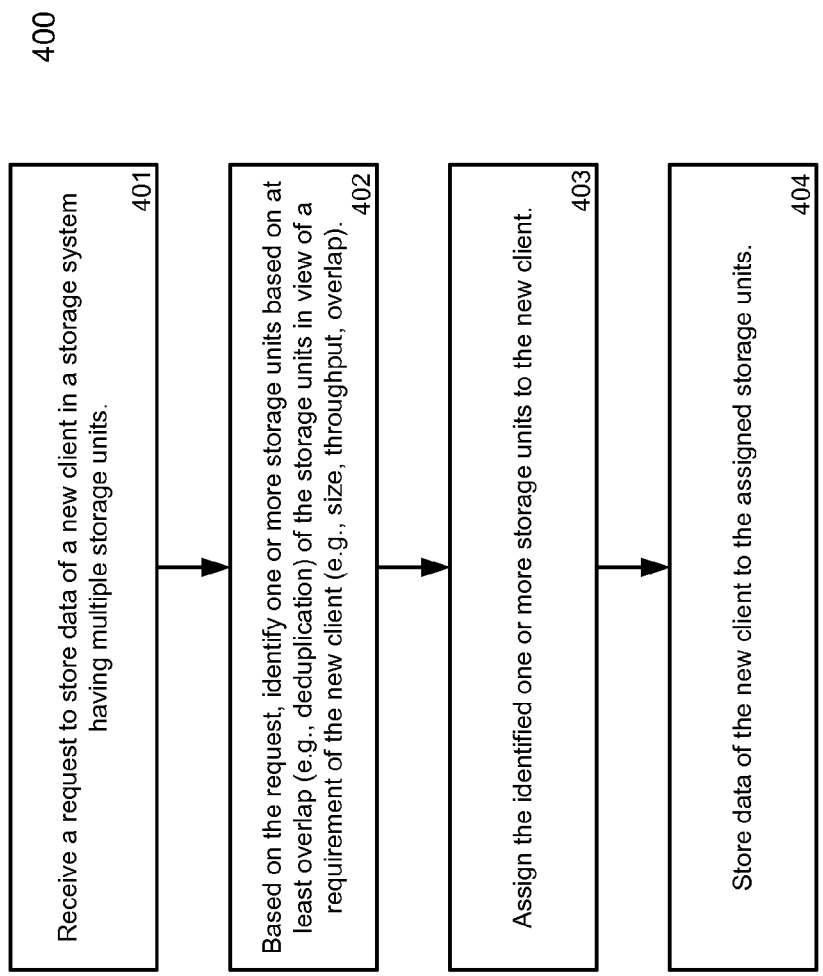

SYSTEM AND METHOD FOR ALLOCATING A STORAGE UNIT FOR BACKUP IN A STORAGE SYSTEM WITH LOAD BALANCING

RELATED APPLICATIONS

This application claims the benefit of co-pending U.S. Provisional Patent Application No. 61/494,768, filed Jun. 8, 2011. This application is also related to co-pending U.S. patent application Ser. No. 13/172,692, entitled "Method for Replicating Data in a Backup Storage System using a Cost Function," filed Jun. 29, 2011. The disclosure of the above applications is incorporated by reference in its entirety.

FIELD OF THE INVENTION

Embodiments of the present invention relate generally to backup storage systems. More particularly, embodiments of the invention relate to a content-aware load balancing backup storage system.

BACKGROUND

In the past decade, many backup environments have evolved from tape-centric to disk-centric. Disk-based backup grew out of the desire to have backup data online and immediately accessible, rather than spread across numerous tapes that had to be located, mounted, and sequentially accessed in case of data loss. Deduplication was used to reduce the capacity requirements of the backup system, in order to permit disk-based backup to compete financially with tape. The most common type of deduplication breaks a data stream into "chunks," using features of the data to ensure that most small changes to the data do not affect the chunk boundaries. This way, inserting a few bytes early in a file might change the chunk where the insertion occurs, but the rest of the file will be deduplicated.

With tapes, a backup server can identify a pool of completely equivalent tape drives on which to write a given backup. When data were ready to be written, the next available tape drive would be used. Capacity for backup would be a non-issue, since it would be trivial to buy more magnetic tape. The main constraint in sizing the backup environment would be ensuring enough throughputs across the backup devices to meet the "backup window," i.e., the time in which all backups must complete.

With deduplicated disk backups, this equivalence across appliances is lost. Writing to the same storage system gains efficiencies by suppressing duplicate data; these efficiencies can be further reflected back to the backup server or even the client being backed up, if the duplicates are identified before data cross the network.

The "stickiness" of the assignment of a client to a storage appliance changes the role of the backup administrator. Instead of simply pooling many clients across many tape drives and worrying only whether all the backups needed on a given night can make their way through the system in time, the mapping of clients to storage appliances needs to be done a priori. Once a client has been paired with a particular storage appliance, it gets great benefits from returning to that appliance and omitting duplicates. Should it move to a different appliance, it must start over, writing all of its data anew. But if its target appliance is overloaded, it queues up and waits longer than desired, possibly causing the backup not to complete within its "backup window."

Capacity is similarly problematic, since a client that is being backed up onto a full storage appliance either is not protected or must move to another less loaded system and pay a cost for copying data that would otherwise have been suppressed through deduplication. In summary, once a client is backed up onto a particular storage appliance, there is a tension between the benefits of continuing to use it and the disadvantages that may ensue from overload; at some tipping point, the client may move elsewhere. It then pays a short-term overhead (lack of deduplication) but gets long-term benefits.

Because of the additional complexity of data movement overheads and the need to estimate capacity requirements in light of content overlap, it is beneficial to automate the assignment of clients to deduplicating backup storage appliances.

Within a backup environment, a number of "clients" are backed up onto a backup storage appliance, which can perform deduplication by identifying chunks that already exist on the appliance. When a client writes duplicate data, a duplicate is most commonly a piece of a file that the same client previously backed up, but it can also be due to overlap with data from a different client backed up onto that appliance. Clients can use a backup protocol that enables them to send the backup appliance only the "fingerprints" that uniquely identify chunks, determine which chunks are not yet stored on the appliance, and send the full content for those chunks.

A similar situation exists when these backup storage appliances are replicated to other backup storage appliances for added redundancy and reliability. One deduplicating backup storage appliance can send another such appliance a set of fingerprints, identify which fingerprints correspond to chunks not already stored by the other appliance, and send the missing chunks. Additionally, techniques such as "delta replication" can be used to further reduce the total amount of data transferred between replicas, by sending commands to recreate a chunk from an existing chunk.

When there are many backup storage appliances being replicated to two or more other backup storage appliances, each appliance being replicated has a choice of replication targets. The choice of target depends on several factors such as capacity, throughput, and other content that already exists on the replication targets or will exist there in the future.

BRIEF DESCRIPTION OF THE DRAWINGS

Embodiments of the invention are illustrated by way of example and not limitation in the figures of the accompanying drawings in which like references indicate similar elements.

FIG. 4 is a flow diagram illustrating a method for efficiently backing up data of a client according to one embodiment of the invention.

DETAILED DESCRIPTION

Figure 1:
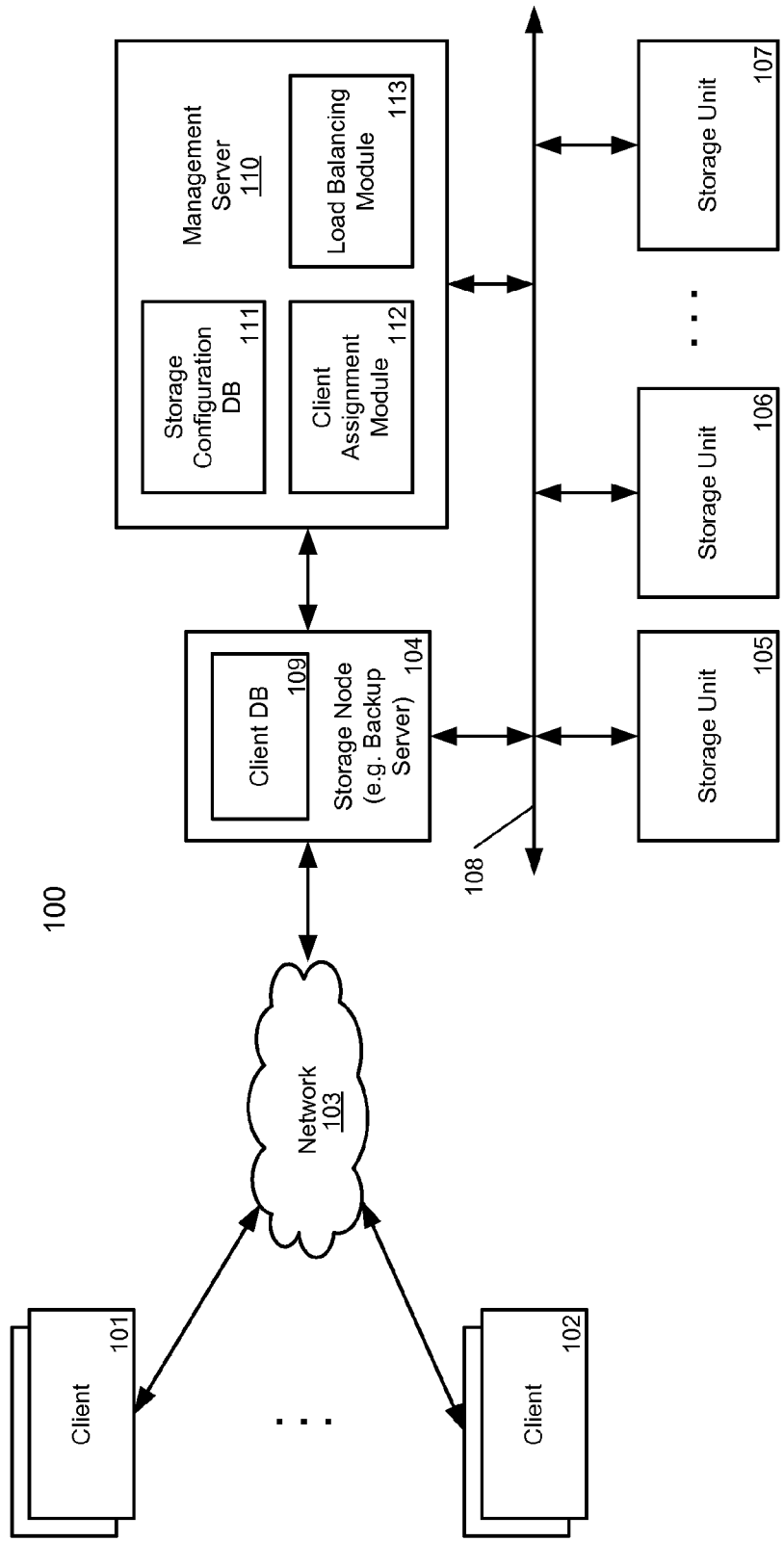
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Deduplication has become a standard component of many disk-based backup storage environments: to keep down capacity requirements, repeated backups of the same pieces of data are replaced by references to a single instance. Deduplication can be applied at the granularity of whole files, fixed-sized blocks, or variable-sized "chunks" that are formed by examining content. When a backup environment consists of a handful of systems (or "clients") being backed up onto a single backup appliance (or "server"), provisioning and configuring the backup server is straightforward. An organization buys a backup appliance that is large enough to support the capacity requirements of the clients for the foreseeable future, as well as capable of supporting the I/O demands of the clients. That is, the backup appliance needs to have adequate capacity and performance for the systems being backed up.

As the number of clients increases, however, optimizing the backup configuration is less straightforward. A single backup administration domain might manage thousands of systems, backing them up onto numerous appliances. An initial deployment of these backup appliances would require a determination of which clients to back up on which servers or storage units. Similar to the single-server environment, this assignment needs to ensure that no server is overloaded in either capacity or performance requirements. But the existence of many available servers adds a new dimension of complexity in a deduplicating environment, because some clients may have more content in common than others. Assigning similar clients to the same server can gain significant benefits in capacity requirements due to the improved deduplication.

The same considerations apply in other environments. For example, the "clients" being backed up might actually be virtual machine images (VMs). VMs that have been cloned from the same "golden master" are likely to have large pieces in common, while VMs with different histories will overlap less. As another example, the systems being copied to the backup appliance might be backup appliances themselves: some enterprises have small backup systems in field offices, which replicate onto larger, more centralized, backup systems for disaster recovery.

Sending duplicate content to a single location can not only decrease capacity requirements but also improve performance, since content that already exists on the server need not be transferred again. Eliminating duplicates from being transmitted is useful in local area network (LAN) environments and is even more useful in wide area network (WAN) environments. Thus, in a deduplicating storage system, content-aware load balancing is desirable to maximize the benefits of deduplication.

Embodiments of the invention are to automate the process of assigning a storage unit to a client for the purpose of backing up data of the client in a backup system having multiple storage units. In one embodiment, a storage unit is automatically selected based on its capacity (e.g., remaining storage space), input/output (IO) requirements (e.g., throughput), and deduplication rate (e.g., overlap content across clients). This technique can be applied in various scenarios: 1) initial deployments or assignments of storages when migrating to a new backup storage environment; 2) first assignment of storage units; 3) reconfigurations of storage units; and 4) disaster recovery of a storage unit.

The initial deployment starts with a "clean slate," where an administrator may have a large number of client machines to be backed up on a number of deduplicating storage appliances. An embodiment of the invention can use information about the size of each client's backups, the throughput required to perform the backups, the rate of deduplication within each client's backups, the rate at which the backup size is expected to change over time, and other information, in order to estimate which storage appliances will be sufficient for this set of clients. Such "sizing tools" are commonplace in the backup industry, used by vendors to aid their customers in determining requirements. Using information about overlapping content across clients allows the tool to refine its recommendations, potentially lowering the total required storage due to improved deduplication.

Once the capacity and performance characteristics of the storage appliances are known, an embodiment of the invention can recommend which clients should be assigned to which storage system. For the first assignment, it is assumed that no clients are already backed up on any storage appliance, so there is no benefit (with respect to deduplication) to preferring one appliance over another.

Once a system is in a steady state, there are a number of possible changes that could result in reconfiguration of the mappings. Clients may be added or removed, and backup storage appliances may be added. Note that a storage unit is unlikely to be removed voluntarily, but a system might fail temporarily. Adding a new client and backup storage simultaneously may be the simplest case, in which the new clients are backed up to the new server(s). More commonly, extra backup capacity will be required to support the growth over time of the existing client population, so existing clients will be spread over a larger number of servers.

The "clients" might be backup storage appliances themselves, which are being replicated to provide disaster recovery. In terms of load balancing, there is little distinction between backing up generic computers (e.g., file servers, databases, etc.) and replicating deduplicating backup servers. However, identifying content overlap is easier in the latter case because the content is already distilled to a set of fingerprints.

In one embodiment, one approach is to maintain a cost function (also referred to as a cost metric) to determine the cost of assigning a set of clients across a set of storage units. The cost is calculated based on several criteria, including but not limited to: 1) how full each storage unit is (i.e., capacity); 2) how busy each storage unit is (e.g., throughput of the storage unit and I/O requirements of the client); 3) variability in the capacity and throughput across the storage units; and 4)

the number of clients, if any, for which there is inadequate capacity. In addition, the capacity requirements of a storage unit may be decreased due to similarity of the data of the clients on a storage unit (e.g., content overlap). Based on the cost using the cost metrics, a set of assignments having the least cost (e.g., lowest penalty) will be made.

In one embodiment, one or more clients are added to a system already containing a set of clients on two or more storage units. The cost of a new configuration in which the newly added clients are mapped to these storage units is calculated based on the above criteria, as well as an additional element of the cost metric based on any reassignment of previously assigned clients to different storage units.

In one embodiment, a monitor or management function is maintained to periodically access how full each storage unit is and how much bandwidth it has to provide, i.e. whether it is overloaded in capacity or performance. When a client is added, the fingerprints of data of the new client are obtained and compared with the fingerprints of the storage units. In one embodiment, a fingerprint is a hash of a data chunk. A client or server is represented by fingerprints of many data chunks, dependent upon whether the fingerprints are sampled and/or the size of the data being fingerprinted. A storage unit having many of the fingerprints contained on the new client is selected and assigned to the client, such that the deduplication rate of the client's data can be improved, lowering capacity requirements.

In another embodiment, when data is received from a new client, the data may be initially stored in a temporary storage (e.g., within the storage node or backup server). Fingerprints of the sample data are computed dynamically and based on the fingerprints, the data may be relocated to another selected storage unit subsequently. Similarly, based on the cost analysis, when a new storage unit is added or load balancing is needed, data stored in the storage units can be relocated or reconfigured for better performance. The assignment and load balancing of storage units may be performed based on the cost associated with the clients and storage units, where the cost may be calculated based on a variety of factors.

FIG. 1 is a block diagram illustrating a storage system according to one embodiment of the invention. Referring to FIG. 1, system 100 includes one or more clients 101-102 communicatively coupled to storage node 104 over a network 103. Storage node 104 is configured to store data from clients 101-102 in one or more of storage units 105-107 coupled to the storage unit 104 over a bus or network 108. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 and/or network 108 may be any type of networks such as a local area network (LAN), a wide area network (WAN) such as Internet, a corporate intranet, a metropolitan area network (MAN), a storage area network (SAN), a bus, or a combination thereof, wired and/or wireless. Storage units need not be collocated on the same network.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a de-duplication storage system available from EMC® Corporation of Hopkinton, Mass. For illustration purposes only, throughout this application, storage node 104 will be described as a backup server.

Storage units 105-107 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 105-107 may also be combinations of such devices. In the case of disk storage media, the storage units 105-107 may be organized into one or more volumes of redundant array of inexpensive disks (RAID).

In one embodiment, system 100 further includes management server 110 coupled to backup server 104 to manage storage units 105-107 over connection 108, which may be a bus, interconnect, or a network. Management server 110 includes storage configuration database 111, client assignment module 112, and load balancing module 113. Storage configuration database 111 is configured to store information concerning each of storage units 105-107. In one embodiment, storage configuration database 111 is configured to store configuration and operating status of each of storage units 105-107 including, but is not limited to, capacity, available bandwidth or throughput, pattern of data stored therein (e.g., fingerprints, deduplication rate, etc.) This information may be collected over a period of time by a monitoring module (not shown).

In one embodiment, backup server 104 further includes client database 109 to store information associated with clients 101-102 including, but is not limited to, the size of full backup, size of incremental backup, schedule of both the full-size backup and incremental backup, effectiveness of deduplication and/or compression, and retention policies, etc. This information may be tracked or captured by the backup software or a monitoring module (not shown) running within backup server 104. Alternatively, this information may be collected by management server 110. Note that client database 109 may also be maintained by another server and accessible by backup server 104 and/or management server 110.

According to one embodiment, information stored in storage configuration database 111 can be used to initially assign one or more of storage units 105-107 to a variety of clients, in view of clients' requirements obtained from client database 109. Such assignments may be performed during an initial deployment of clients and/or storage units. As a result, the processing load of data backup and access can be balanced and performance can be improved. Data stored in the storage units is then less likely in need of relocation to another storage unit due to imbalanced load or lack of capacity, etc. Furthermore, the deduplication rate of data can also be improved, for example, by storing similar data or overlapped data in the same storage unit. Such an initial assignment of storage units can be performed when clients are migrated to a new storage system.

In addition, when a new client is added to the storage system, according to one embodiment, one or more of storage units 105-107 may be selected based on the new client's requirement (e.g., size, required throughput, and data pattern, etc. obtained from client database 109) and the configuration and/or operating state of the storage units (e.g., capacity, throughput, data pattern of data stored therein, etc. obtained from storage configuration database 111). Similarly, when a new storage unit is added to the storage unit, according to one embodiment, information obtained from storage configuration database 111 and client database 109 can be utilized to determine which of client or clients can be assigned to the new storage unit by client assignment module 112.

In one embodiment, a storage unit is selected and assigned to a client based on a deduplication rate of the selected storage unit in view of the client's requirement. A storage unit having a deduplication rate higher than a predetermined threshold may be selected and assigned to the client. In one particular embodiment, a storage unit is identified that has a marginal deduplication rate representing the added deduplication due to cross-client overlap between this client and another client, where the marginal deduplication rate is greater than a predetermined threshold. In particular, fingerprints of at least a portion of client's data are compared with fingerprints of at least a portion of data stored in each of the storage units. A storage unit containing a significant fraction of the fingerprints of the client is selected and assigned to the client. However, according to another embodiment, if the storage capacity of a storage unit containing most of the fingerprints of the client cannot satisfy the requirement of the client, a storage unit containing less of the fingerprints of the client (e.g., next available storage unit containing the most of the client's fingerprints), but with enough storage capacity, may be selected and assigned to the client.

Further, according to one embodiment, the information obtained from storage configuration database 111 and client database 109 can also be utilized to redistribute or relocate data stored in one storage unit to another storage unit by load balancing module 113 for load balancing purposes. For example, data of a first pool of storage units can be migrated to a second pool of storage units (e.g., a pool of larger storage units) based on the information obtained from storage configuration database 111 and/or client database 109. Note that at least a portion of the functionality of management server 110 may also be integrated with storage node 104, for example, as a processing layer between backup software of storage node 104 and a storage interface for accessing storage units 105-107.

Figure 2A:
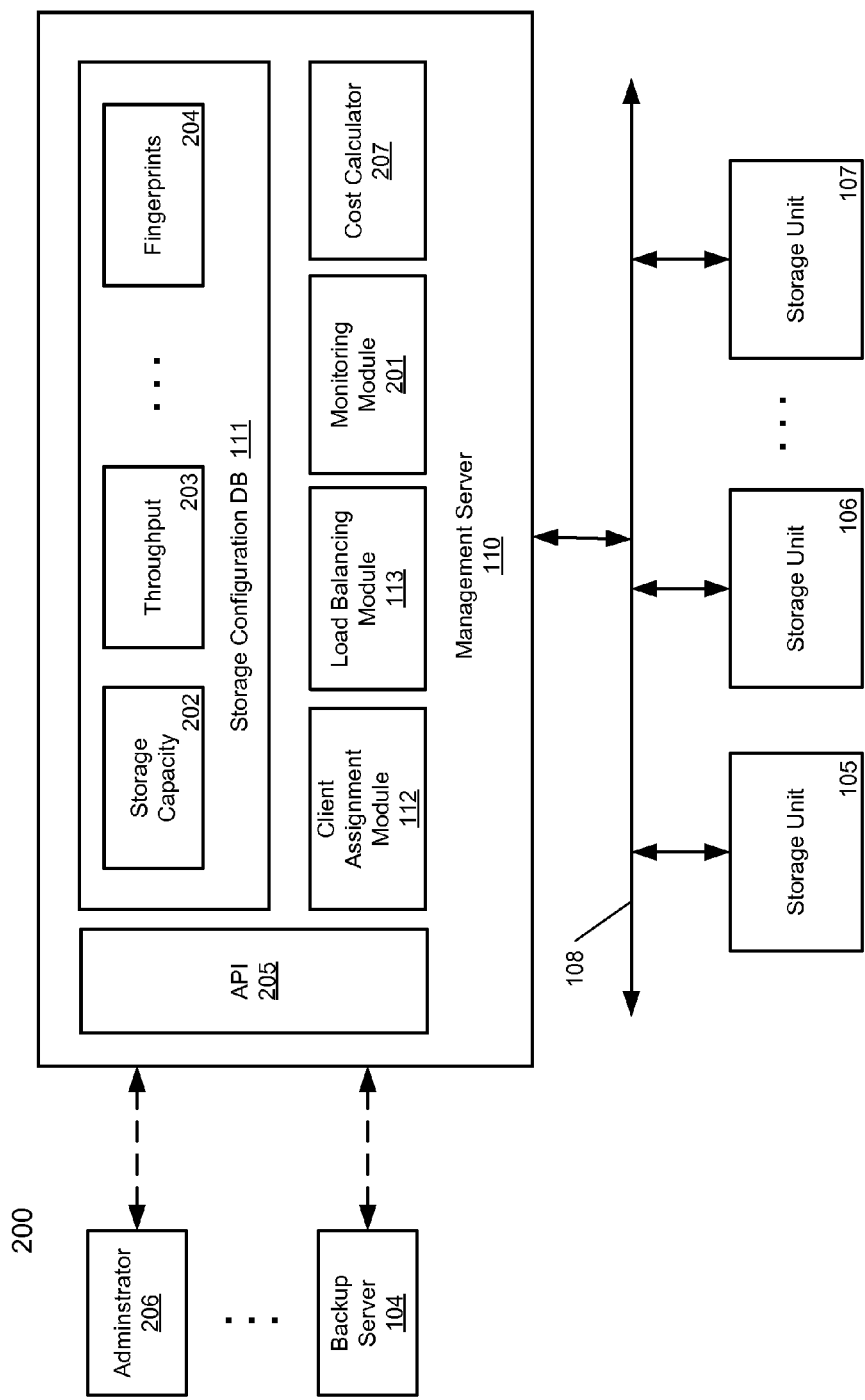
FIGS. 2A and 2B are block diagrams illustrating a management server according to some embodiments of the invention.

FIG. 2A is a block diagram illustrating a management server according to one embodiment of the invention. For example, system 200 may be implemented as part of system 100 of FIG. 1. Referring to FIG. 2A, system 200 includes management server or node 110 communicatively coupled to one or more storage units 105-107 over a bus, interconnect, or network 108. Management server 110 includes a monitoring module 201 to periodically or constantly monitor operating statuses or states of storage units 105-107, and to store the operating statuses or states in storage configuration database 111 including, but are not limited to, storage capacity 202, bandwidth or throughput 203, and fingerprints 204 for each of storage units 105-107. The information stored in storage configuration database 111 can be utilized by client assignment module 112 and/or load balancing module 113 to assign a particular storage unit to a client and to redistribute data stored in one storage unit to another storage unit for load balancing purposes.

In one embodiment, management server 110 further includes application programming interface (API) 205 to allow other entities or components, such as administrator 206 and backup server 104, to access management server 110. In one embodiment, in response to a new client to be added to the storage system, backup server 104 can communicate with management server 110 via API 205 to request one or more of storage units 105-107 to be assigned to the new client for storing backup data from the new client. Based on the request, client assignment module 112 is configured to identify and select one or more of storage units 105-107 based on information obtained from storage configuration database 111, for example, based on at least one of capacity 202, throughput 203, and fingerprints 204 of storage units 105-107, in view of client's requirements which may be provided by backup server 104.

According to one embodiment, when a new client is added, backup server 104 transmits the request for allocating a storage unit to management server 110 via API 205. The request includes information describing the new client, which may be obtained from a client database maintained by backup server such as client database 109 of FIG. 1. The information of the new client may include the size of backup, backup schedule, retention policy, and data pattern, etc. Based on the client information and storage information obtained from storage configuration database 111, a cost or cost factor is calculated by cost calculator for each of storage units 105-107. The cost may be calculated by cost calculator based on a cost function or cost metric, which will be described in details further below.

In one embodiment, the request includes fingerprints of data associated with the new client representing at least some of the data patterns associated with the new client. The fingerprints may be calculated based on samples of data to be backed up for the new client. The fingerprints may be dynamically computed by backup server 104 or computed by another entity (e.g., the new client or a dedicated node) and received by backup server 104.

According to one embodiment, the fingerprints received from backup server can be used by client assignment module 112 to compare with fingerprints 204 of each of storage units 105-107 to identify or select one or more of storage units 105-107 to be assigned to the new client. The fingerprints of the new client and fingerprints 204 may be computed using a variety of hash algorithms, such as the SHA-1 or MD-5 hash algorithms. In one embodiment, a storage unit having fingerprints identical to a substantial number of the fingerprints associated with the new client is identified and selected to be assigned to the new client. When the fingerprints of a storage unit strongly overlap the fingerprints from the new client, it is likely that the data patterns of the new client and the data currently stored in the storage unit are similar. As a result, when data of the new client is stored in the selected storage unit, the deduplication rate can be increased, since the content of the new client and the content stored in the selected storage unit may be overlapped.

Once one or more storage units have been selected and assigned by client assignment module 112, identifiers of the selected storage units are returned to backup server 104 via API 205. Thereafter, backup server 104 can direct the backup data from the new client to the assigned storage unit(s). In this scenario, backup server 104 is configured to request a storage unit to be assigned to a new client. In another scenario, an administrator 206 can also manually send a request to management server 110 via API 205 requesting a storage unit to be assigned to a particular client.

According to another embodiment, data of the new client may be temporarily stored in a storage location (e.g., backup server 104 or a designated storage unit allocated from storage units 105-107. Subsequently, the data stored in the temporary storage location is examined by computing fingerprints of at least a portion of the data. The fingerprints are then used to identify or allocate one or more storage units from storage units 105-107 and the data is then migrated to the identified storage unit(s).

According to a further embodiment, information stored in storage configuration database 111 can also be utilized to rebalance the load of storage units 105-107. For example, monitoring module 201 may detect that the load of storage units 105-107 may be out of balance and may issue a command to rebalance the load. Alternatively, such detection may be performed by backup server 104 and/or administrator 206. Based on the information obtained storage configuration database 111, data stored in storage units 105-107 may be redistributed to other storage units, for example, to improve overall throughput and/or deduplication rate.

Figure 2B:
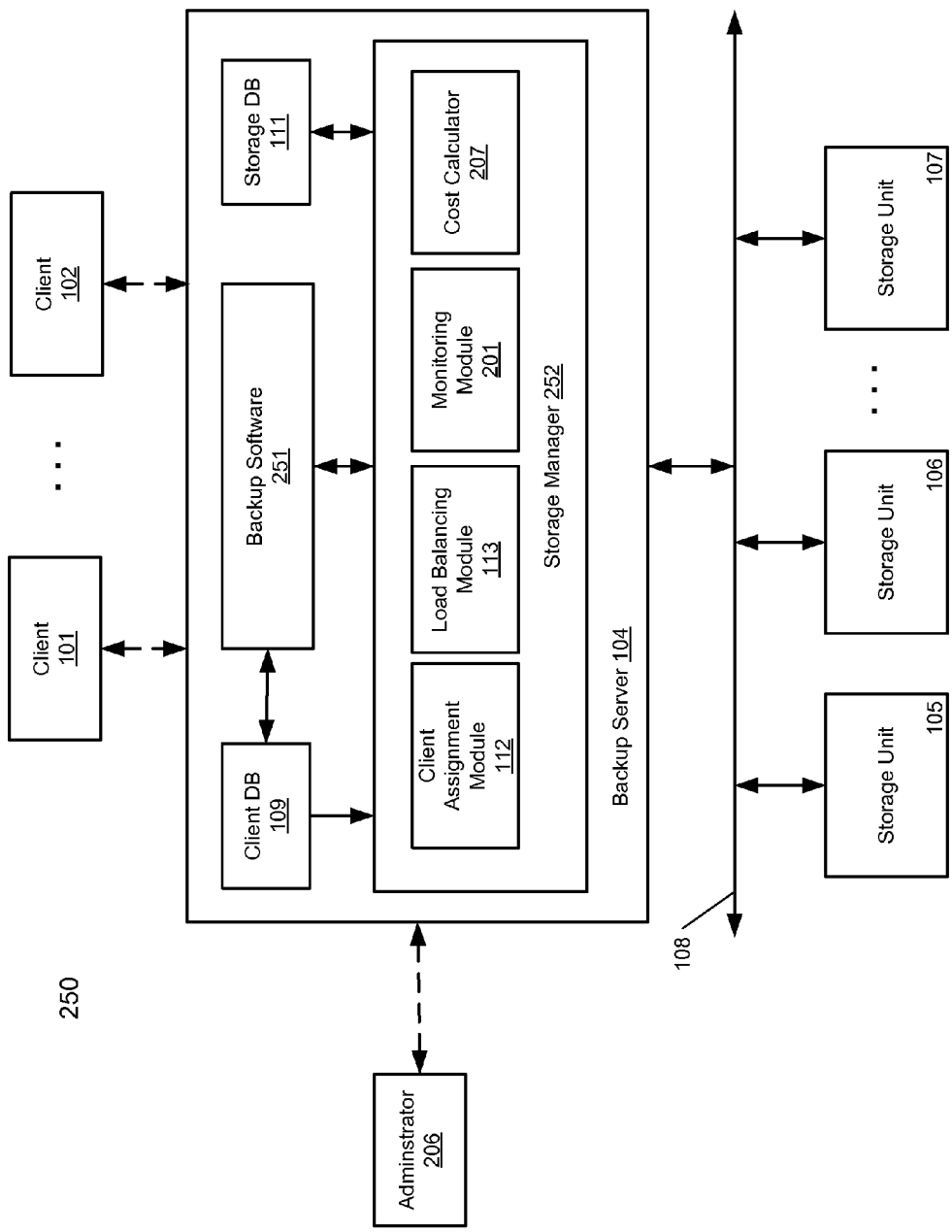

Note that some or all of the functionalities of management server 110 may also be implemented within a storage node such as a backup server. FIG. 2B is a block diagram illustrating a storage system according to another embodiment of the invention. Referring to FIG. 2B, the above described functionalities are implemented as part of storage manager 252, which is located between backup software 251 and storage units 105-107. Also note that components as shown in FIGS. 2A-2B may be implemented in software, hardware, or a combination of both. For example, components as shown in FIGS. 2A-2B may be executed from a machine-readable storage medium by one or more processors.

According to one embodiment, a storage unit is identified or selected for a new client or data migration from one storage unit to another storage unit based on a cost factor or score for such a transaction. In one embodiment, the cost may be calculated by cost calculator 207 which may utilize a cost function or cost metric to compute the cost for assigning a particular storage unit to a client or the cost for migrating data from one particular storage unit to another particular storage unit. The migration cost may be calculated based on the client information (e.g., backup size and schedule, required throughput, retention periods, etc.) and information of the storage units (e.g., capacity, available bandwidth or throughput, data patterns, etc.)

One goal is to assign clients to backup servers without overloading any individual server, either with too much data being stored or too much data being written during a backup window. In one embodiment, a cost metric is defined to provide a single utility value for a given configuration. Exceeding capacity is considered fatal, in that it is not a transient condition and cannot be recovered from without allocating new hardware. Exceeding throughput is not as bad as exceeding capacity. Even if not exceeded, the closer capacity or throughput is to the maximum allowable, the higher the "cost" of that configuration. In contrast, having a significantly lower capacity utilization than is allowable may be good, but being 20% full is not "twice as good" as being 40% full. As a result, the cost is nonlinear, with dramatic increases close to the maximum allowed and jumps to extremely high costs when exceeding the maximum allowed.

In one embodiment, the basic cost starts with a weighted sum of a measure of variation of the capacity and throughput utilizations of the storage appliances. In one embodiment, the measure of variation represents a standard deviation. The notion is that if the predicted utilizations are completely equal, there is no benefit to adjusting assignments and increasing that skew; however, as mentioned above, one might redefine this metric to exclude one or more systems explicitly targeted to have excess capacity for future growth.

There are then some add-ons to the cost to account for penalties. In one embodiment, there are at least two thresholds: 1) an upper threshold (e.g., 100%) above which things are clearly unacceptable; and 2) a lower threshold (e.g., 80%) of the maximum capacity or throughput) that indicates a danger zone. The highest penalty is for being over 100% storage capacity, then for being over 100% throughput. If an appliance within a threshold of the maximum (e.g., 20% threshold) for capacity or throughput, a lesser penalty is assessed. If it is below 80% of the maximum, no penalty is assessed for throughput, and a small cost is applied for capacity to reflect the benefit of additional free space. Generally, a decrease on one appliance is accompanied by an increase on another and these costs balance out across configurations, but content overlap can cause unequal changes.

An additional add-on the cost is a per-client penalty for failing to allocate capacity for a client. In one embodiment, there is a fixed cost, such as 1000 per client not allocated. This penalty is in addition to the penalty for exceeding the upper threshold for capacity and is used to distinguish between two cases that have the same amount of unsatisfied capacity but different numbers of clients affected by this unsatisfied capacity. For example, a client that requires 2 TB of storage might be assigned to a node with 1 TB available, and another client requiring 1 TB might be assigned to a node with 0.5 TB available. Swapping the two clients results in the same amount of unsatisfied capacity (1.5 TB), but now only the 2 TB client fails to be backed up. In one embodiment, importance values or weights can be assigned to some of the clients such that they have a greater impact on the score function and are more likely to be assigned.

The threshold-based penalties are weights that vary by one or more orders of magnitude, with the effect that any time one or more storage appliances is overloaded, the penalty for that overload dominates the less important factors. Only if no appliance has capacity or throughput utilization over the lower threshold do the other penalties such as skew, data movements, and small differences in utilization, come into play. Within a given cost region, variations in load still provide an ordering: for instance, if a server is at 110% of its capacity and a change in assignments brings it to 105%, it is still severely loaded but the cost metric is reduced. As a result, that change to the configuration might be accepted and further improved upon to bring utilization below 100% and, hopefully, below 80%. Threshold-based penalties are marginal, in that at each threshold the penalty is the sum of the penalty for reaching that threshold and a penalty with a higher weight for the value above the threshold. That is, the penalty just above a threshold is only slightly greater than the penalty just below it, but it increases at a faster rate beyond the threshold.

The final cost is for data movement: if a client was previously assigned to one system and moves to another, a penalty is assessed in proportion to that client's share of the original system's capacity. This penalty is weighted by a configurable "movement weight." In one embodiment, a cost associated with a storage unit may be computed using the following algorithm:

$$C = \alpha D_S + (1 - \alpha)D_T + \sum_{n=1}^{m} (F_n + S_n + T_n + M_n)$$

where $\alpha$ is a configurable weight (defaulting to 0.8), $D_s$ is the standard deviation of storage utilizations $U_{n,s}$ (all numbers between 0 and 1, or above 1 if a node is overloaded), $D_T$ is the standard deviation of throughput utilizations $U_{n,t}$ (all numbers between 0 and 1, or above 1 if a node is overloaded), and for each node n there is a cost associated with fit penalty ($F_n$, a function of the number of clients not fitting on node n), storage ($S_n$, a function of the individual storage utilizations $U_{n,s}$), throughput ($T_n$, a function of the individual throughput utilizations $U_{n,t}$), and movement ($M_n$, a function of the clients that change assignments relative to the capacity of the nodes each one departs).

These parameters may be calculated as follows, according to one embodiment, although the weights are merely exemplary:

$$S_n = \begin{cases} .1*.8 + 100*.2 + 10000*(U_{n,s} - 1) & \text{if } U_{n,s} > 1 \\ .1*.8 + 100*(U_{n,s} - .8) & \text{if } .8 \leq U_{n,s} \leq 1 \\ .1*U_{n,s} & \text{if } U_{n,s} \leq .8 \end{cases}$$

$$T_n = \begin{cases} 10*.2 + 1000*(U_{n,s} - 1) & \text{if } U_{n,t} > 1 \\ 10*(U_{n,s} - .8) & \text{if } .8 \leq U_{n,t} \leq 1 \\ 0 & \text{if } U_{n,t} \leq .8 \end{cases}$$

$$M_n = \sum_{clients_n} \text{movement\_penalty\_factor} * \frac{\text{size}_{client}}{\text{size}_n}$$

In this particular embodiment, constants 10000, 100, 1000, and 10 are used to separate the regions of bad configurations: all are bad, but some are worse than others. The weight of 0.1 for the more lightly loaded utilization makes adjustments in the range of the other penalties such as utilization skew. In the above example, according to one embodiment, a storage utilization factor ($S_n$) is applied or assigned with a first weight (e.g., heaviest weight, $(0.1*0.8+100*0.2+10000*(U_{n,s}-1))$) if the storage utilization (e.g., $U_{n,s}$) is greater than a first threshold (e.g., an upper threshold, in this example, 1). The storage utilization factor ($S_n$) is applied or assigned with a second weight (e.g., heavy weight, $(0.1*0.8+100*(U_{n,s}-0.8))$) if the storage utilization is less than the first threshold and greater than a second threshold (e.g., a lower threshold, in this example, 0.8). The storage utilization factor ($S_n$) is applied or assigned with a third weight (e.g., less heavy weight, $(0.1*U_{n,s})$) if the storage utilization is less than the second threshold.

Similarly, according to another embodiment, a throughput utilization factor ($T_n$) is applied or assigned with a fourth weight (e.g., heaviest weight, $(10*0.2+1000*(U_{n,t}-1))$) if the throughput utilization (e.g., $T_{n,t}$) is greater than a third threshold (e.g., an upper threshold, in this example, 1). The throughput utilization factor ($T_n$) is applied or assigned with a fifth weight (e.g., heavy weight, $(10*(U_{n,t}-0.8))$) if the throughput utilization is less than the third threshold and greater than a fourth threshold (e.g., a lower threshold, in this example, 0.8). The throughput utilization factor ($S_n$) is applied or assigned with a sixth weight (e.g., less heavy weight, 0) if the throughput utilization factor ($T_n$) is less than the fourth threshold.

Movement_penalty_factor is a value to scale the contribution of each migrated client relative to the other costs, and may be adjusted to appropriately balance the benefit of rebalancing against the cost of migration. A typical value may be in the range [1, 5]. $D_S$ and $D_T$, the standard deviation of the capacities and throughput respectively, are a commonly used statistical metric. Each storage capacity value is commonly in the range [0, 1] although it can exceed 1 if the requirements of the clients would exceed the capacity of the storage unit. The standard deviation is therefore typically in the range [0, 2]. Note that the constants utilized above are described for illustration purpose only; other values of the constants can also be applied.

According to some embodiments, the assignment of a client can be performed using a variety of algorithms, such as, for example, random, round-robin, bin-packing, and simulated annealing methods. Using a random method, a client is randomly assigned to a storage unit. Random assignment may be repeated an arbitrary number of times, selecting the outcome with the lowest cost metric. Random assignment can also use the random selection as a starting point, proceeding sequentially through the pool of storage units until a unit with sufficient available capacity is identified. Using a round-robin method, a client is assigned in order, regardless of the size. Again, storage units with insufficient capacity can be skipped. If no storage unit has sufficient capacity, the original random or round-robin selection may be used, recognizing that the client will not fit, but computing the appropriate cost metric.

Using a bin-packing method, a client is assigned based on capacity, in decreasing order of required capacity to a storage unit with the most available space. This is done without taking content overlap into account. A simulated annealing method starts with a result from one of the other methods, such as bin-packing and then perturbs the assignments attempting to lower the cost. The simulated annealing method accepts a set of initial assignments, rather than starting with a random assignment. It accepts a specification of the percentage of assignments to change in a given "trial," when it tries to determine if a change results in a better outcome. This percentage decreases over time. The probability of moving a client from one storage unit to another or swapping it with a client currently assigned to the storage unit is configurable. The choice of the target systems for which to modify assignments can be provided externally. This allows it to focus on targets that are overloaded rather than moving assignments among equally underloaded systems.

According to one embodiment, the cost may also be determined based on overlap between data to be backed up and the data stored in each storage unit. There are a number of ways by which one can determine the overlap of content on individual systems. In each case one can start with a set of "fingerprints" representing individual elements of deduplication, such as chunks. These fingerprints need not be as large as one would use for actual deduplication. For instance, a 12-byte fingerprint with a collective false positive rate of $2^{32}$ is fine for estimating overlap even if it would be bad for actually matching chunks—for that one might use 20 bytes or more, with a false positive rate of $2^{96}$. The fingerprints can be collected by reading and chunking the file system, or by looking at existing backups that have already been chunked.

Given fingerprints for each system, according to some embodiments, there are two basic approaches to computing overlap (e.g., deduplication): sort-merge and Bloom filters. With sort-merge, the fingerprints for each system are sorted, and then the minimal fingerprint across all systems is determined. That fingerprint is compared to the minimal fingerprint of all the systems, and a counter is incremented for any systems that share that fingerprint, such that the pair-wise overlap of all pairs of systems is calculated. After that fingerprint is removed from the sorted lists corresponding to the systems containing it, the process repeats.

With Bloom filters, the systems are processed sequentially. Fingerprints for the first system are inserted into its Bloom filter. Then for each subsequent system, fingerprints are added to a new Bloom filter, one per system. When these fingerprints are new to that system, they are checked against each of the previous systems, but not added to them. The sort-merge process can be precise, if all fingerprints are compared. Bloom filters have an inherent error rate, due to false positives when different insertions have collectively set all the bits checked by a later data element. However, that false positive rate can be fairly low (e.g., 0.001%), depending on the size of the Bloom filter and the number of functions used to hash the data.

If the Bloom filters are all sufficiently sparse after all insertions have taken place, according to one embodiment, another way to estimate overlap is to count the number of intersecting bits that have been set in the bit-vector; however, for "standard-size" Bloom filters it is easy to have a 1% overlap of fingerprints result in 20%-30% overlap in bits. To get the overlap of the Bloom filters to match the overlap of fingerprints, either each filter would need to be scaled to be significantly larger than would normally be required for a given number of elements, which would in turn put more demands on system memory, or the number of bits set for each entry would have to be reduced, increasing the rate of false positives.

Regardless of which approach is used, there is an additional concern with respect to clustering more than two clients together. One goal is to identify what fraction of a new client A already exists on a system containing data from clients B, C, . . . Z. This is equivalent to taking the intersection of A's content with the union of the content of the clients already present:

$$Dup(A)=A \cap (B \cup C \cup \ldots \cup Z)$$

However, the contents of every client cannot be stored and the union and intersection cannot be computed on the fly. To get an accurate estimate of the intersection, it is ideal to precompute and store enough information to estimate this value for all combinations of clients. If one only computes the number of chunks in common between A and B, A and C, and B and C, then one would not know how many are shared by all of A, B, and C. For example, if $A \cap B=100$, $A \cap C=100$, and $B \cap C=100$, $A \cap B \cap C$ may be 100 as well, or it may be 0. If A and B are already assigned to a server and then C is added to it, C may have as little as 100 in common with the existing server or it may have as many as 200 overlapping. The value of $A \cap B \cap C$ provides that quantity.

Figure 3A:
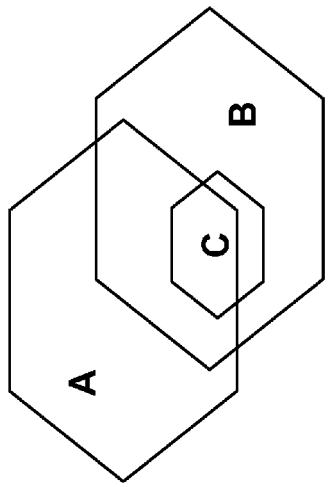
FIGS. 3A-3D depict some scenarios of overlapping data.
Figure 3B:
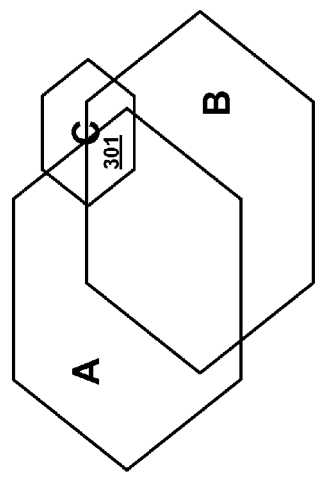
Figure 3C:
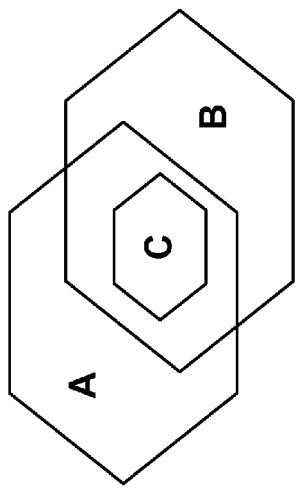
Figure 3D:
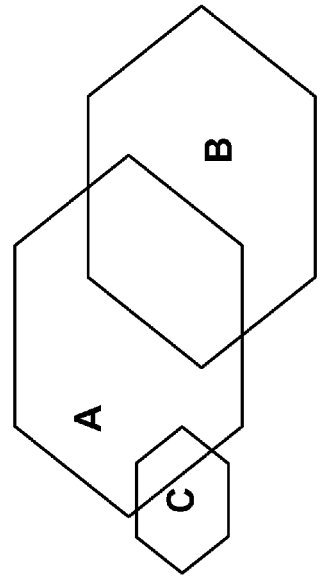

FIGS. 3A-3D depict some data overlapping scenarios in a three-client example. In the first two cases as shown in FIGS. 3A and 3B, C is a subset of B, so even though C overlaps with A the entire overlap can be computed by looking at A and B. In the third case as shown in FIGS. 3C, B and C are completely distinct, and so if A joined a storage appliance with B and C the content in AB and AC would all be duplicates and the new data would consist of the size of A minus the sizes of AB and AC. The last case as shown in FIG. 3D shows the more complicated scenario in which B and C partially intersect, and each intersects A. Here, region 301 highlights an area where A intersects both B and C, so subtracting AB and AC from A's size would overestimate the benefits of deduplication. The size of the region ABC must be counted only once.

Therefore, according to one embodiment, the initial counts are stored at the level of the largest cluster. By counting the number of chunks in common among a set S of clients, one can enumerate the $2^{|S|}$ subsets and add the same number of matches to each subset. Then, for each client C, one can compute the fraction of its chunks that are shared with any set of one or more other clients; this similarity metric then guides the assignment of clients to servers.

To keep the overhead of the subset enumeration from being unreasonable, according to one embodiment, the maximum value of S can be set. Fingerprints that belong to $>S_{max}$ clients are shared widely enough not to be interesting from the perspective of content-aware assignment, for a couple of reasons: first, if more clients share content than would be placed on a single storage appliance; the cluster will be broken up regardless of overlap; and second, the more clients sharing content, the greater the odds that the content will exist on many storage appliances regardless of content-aware assignment. Empirically, a good value of $>S_{max}$ is in the range of $[S/3, S/2]$.

In addition, it is possible to approximate the effect of larger clusters by pruning the counts of matches whenever the number is small enough. For instance, if AB is 10% of A and 5% of B, AC is 15% of A and 5% of C, and ABC is 0.5% of A, then one can estimate from AB and AC that adding A to B and C will duplicate 25% of A's content. This overestimates the duplication by 0.5% of A since it counts that amount twice, but the adjustment is small enough not to affect the outcome. Similarly, in FIG. 9D, region 901 of overlap ABC is much greater than the intersection only between A and C that does not include B: adding A to B and C is approximately the same as adding A to B alone, and C can be ignored if it is co-resident with B.

Given the overlap of any combination of clients, the assignment tool can optimize for the best deduplication by identifying combinations of clients that overlap extensively. This is done by mapping one or more clients to a storage unit, then later assessing the overlap of a new client with those clients. If the new client is found to have X % of its content in common with the clients already there, the assignment tool subtracts X % of the size of the new client in estimating its storage requirements. The lower capacity requirement is reflected in a lower cost metric and potentially an ability to store more clients on a given set of backup storage units.

FIG. 4 is a flow diagram illustrating a method for efficiently backing up data of a client according to one embodiment of the invention. Method 400 may be performed by system 100 of FIG. 1 or systems of FIGS. 2A-2B. Referring to FIG. 4, at block 401, a request to store (e.g., back up) data of a new client is received in a storage system having multiple storage units. Based on the request, at block 402, one or more storage units are identified based on at least amount of overlap data of the storage units in view of the client's data to be stored. The one or more storage units may also be identified based on the available capacity and throughput of the storage units in view of client's size and throughput requirement. In one embodiment, the one or more storage units are identified based on a cost of overall storage unit configuration calculated using a cost function as described above. At block 403, the identified storage units are assigned to the new client and at block 404, the data of the new client is stored in the assigned storage units.

Figure 5:
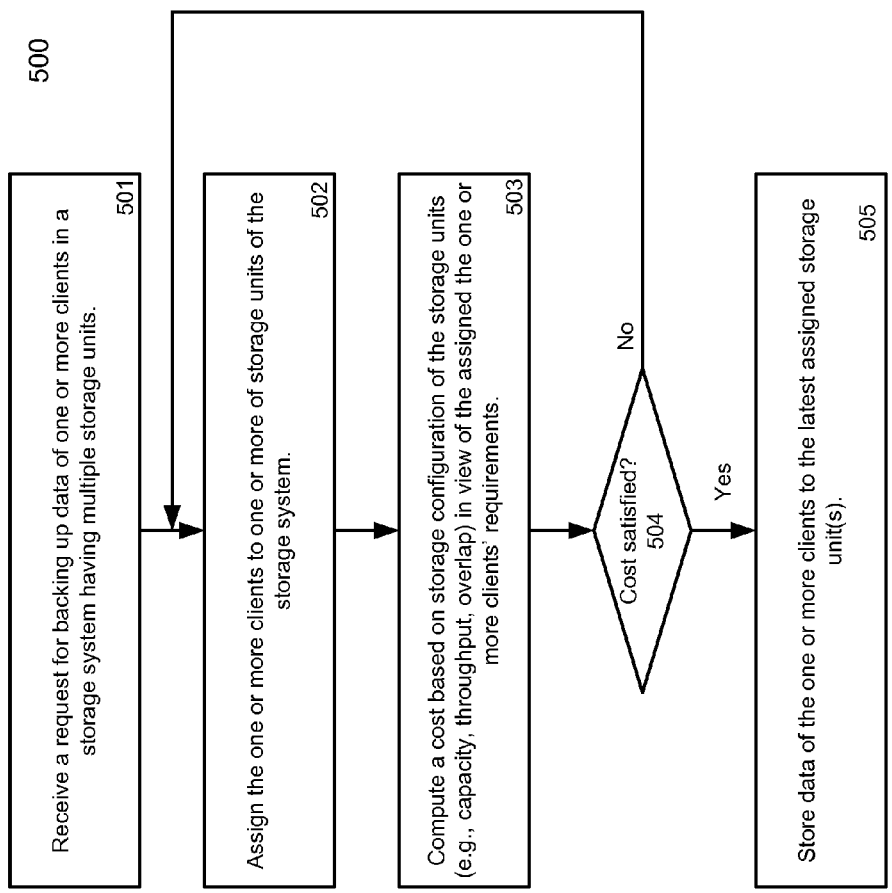
FIG. 5 is a flow diagram illustrating a method for assigning a storage unit to a client according to one embodiment of the invention.

FIG. 5 is a flow diagram illustrating a method for assigning a storage unit to a client according to one embodiment of the invention. Method 500 may be performed by management server 110 of FIGS. 1-2. Referring to FIG. 5, at block 501, a request is received for backing up data of one or more clients in a storage system having multiple storage units. At block 502, assign the one or more clients to one or more of storage units. At block 503, a cost is computed based on storage configuration (e.g., available capacity, available throughput, and fingerprints) of the storage units in view of requirements (e.g., size, throughput requirement, and fingerprints) of the one or more clients. At block 504, it is determined whether the computed cost is satisfied against a set of one or more rules (e.g., cost threshold or number of iterations). If not, the operations of blocks 502-503 are iteratively performed by assigning the one or more clients to different storage units and computing the cost based on the new configuration until the cost is satisfied, upon which at block 505, the backup data of the one or more clients is stored in the latest assigned storage unit or units. Method 500 can be applied to assign an individual new client and to assign multiple clients to a storage system.

Figure 6:
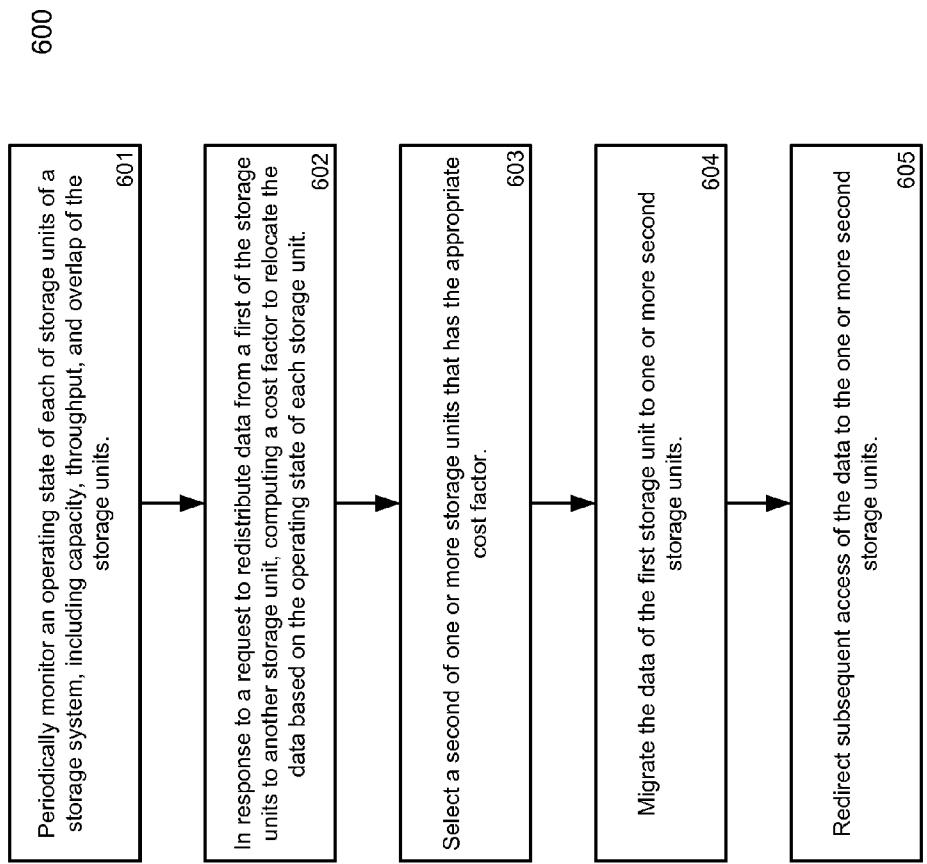
FIG. 6 is a flow diagram illustrating a method for assigning a storage unit to a client according to one embodiment of the invention.

FIG. 6 is a flow diagram illustrating a method for assigning a storage unit to a client according to one embodiment of the invention. Method 600 may be performed by management server 110 of FIGS. 1-2. Referring to FIG. 6, at block 601, processing logic periodically monitors an operating state of each of storage units in a storage system including, but is not limited to capacity, throughput, and data pattern of each storage unit. At block 602, in response to a request to redistribute or migrate data of a first storage unit to another storage unit, processing logic compute a cost factor of moving the data from the first storage unit to each of a pool of storage units based on the operating state of the storage units. The operations performed at block 602 can be iteratively performed by moving data to different storage units to determine the lowest cost. At block 603, a second storage unit is identified and selected that has the lowest cost factor. At block 604, the data of the first storage unit is migrated to the second storage unit and at block 605, subsequent access of the data is redirected to the second storage unit.

Figure 7:
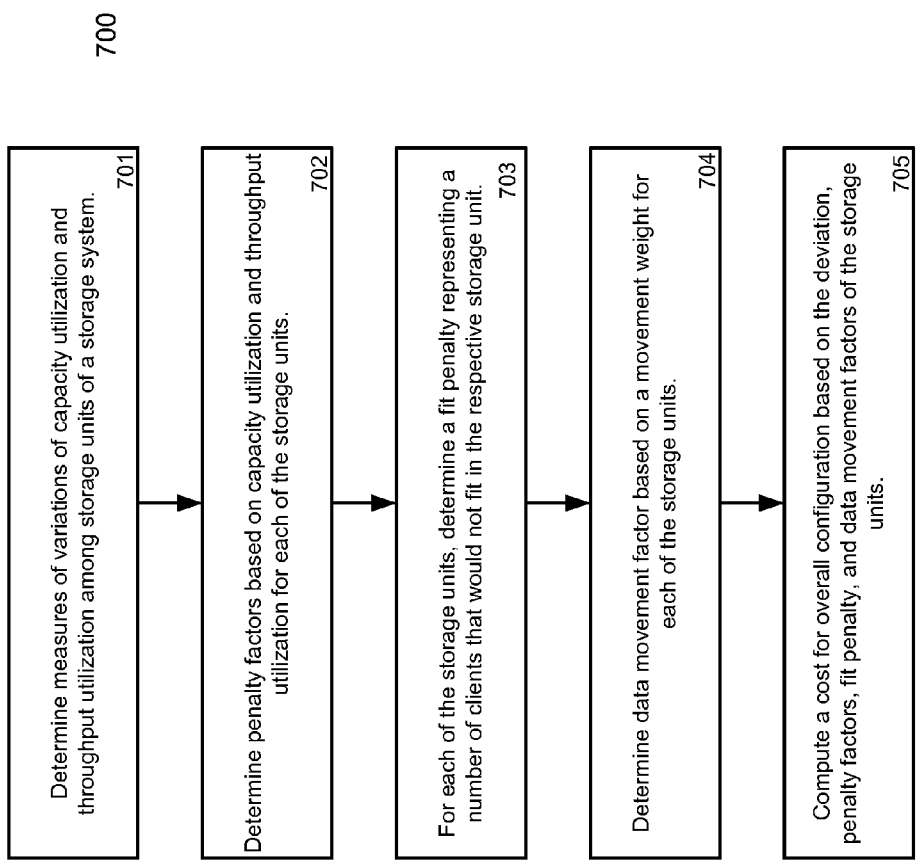
FIG. 7 is a flow diagram illustrating a method for assigning a storage unit to a client according to one embodiment of the invention.

FIG. 7 is a flow diagram illustrating a method for computing a cost of assigning a storage unit to a client according to one embodiment of the invention. Method 700 may be performed by management server 110 of FIGS. 1-2. Referring to FIG. 7, at block 701, a deviation of capacity utilization and throughput utilization is determined across the storage units of a storage system. At block 702, penalty factors are determined based on capacity utilization and throughput utilization of each storage unit. At block 703, determine a fit penalty for each of the storage units, the fitness penalty representing data of number of clients that would not fit in the storage unit. At block 704, data movement factor is determined based on a movement weight of each storage unit. At block 705, a cost for overall configuration is computed based on the deviation, penalty factors, and data movement factors of the storage units.

According to some embodiments, the techniques described above can also be applied to replication of backup data in a deduplicated storage system, particularly, when a "client" is in fact itself a deduplicating backup appliance. Some enterprises have smaller backup systems in field offices, which replicate onto larger, more centralized, backup systems for disaster recovery. The centralized backup systems need adequate capacity and performance to accommodate the collection of smaller systems. Because the smaller backup servers aggregate content from multiple clients but act as a sort of client in the context of the larger centralized backup systems, the smaller backup servers are sometimes referred to as "super-clients."

Similar to the single-server environment, assigning super-clients for replication needs to ensure that no server is overloaded in either capacity or performance requirements. But the existence of many available servers adds a new dimension of complexity in a deduplicating environment, because the super-clients are heterogeneous. They vary in content (e.g., some super-clients may have more content in common with each other than others), size, and network connectivity. Assigning super-clients with common or similar content to the same server can gain significant benefits in both capacity requirements and performance due to the improved deduplication. The capacity improvement derives from storing each chunk only once, while the performance improvement comes from sending only a fingerprint representing a chunk rather than sending the entire chunk.

Additionally, the heterogeneity of network connectivity offers an opportunity to optimize the schedule of replications to maximize performance. When assigning a super-client to a server, according to one embodiment, the network throughput between the machines can be incorporated into an assignment algorithm, for example, using certain assignment techniques described above. Additionally, if two super-clients each independently store a large volume of identical data, but one has higher throughput to the server when replicating, according to one embodiment, it is advantageous to have the super-client with higher throughput replicate first. Its unique data will be written to the server, and a later replication by the other super-client will be able to send only the fingerprints of the data they share in common.

Another consideration in the assignment of super-clients to backup storage devices is potential restrictions on placement. Some super-clients may be particularly important or have other requirements for security or reliability, so these super-clients may be limited to specific backup servers rather than being allowed equally on any of them. A policy for assigning super-clients to servers may incorporate geographic distribution requirements.

According to one embodiment, the assignment of super clients may also be based on a cost generated from a cost function. The cost function for assigning super-clients to backup servers can be similar to the cost function when assigning individual clients as described above. There is a large penalty for approaching or exceeding thresholds for capacity or throughput and a smaller penalty for imbalance among backup servers in capacity or throughput. Because of the heterogeneity of connectivity, according to one embodiment, throughput may be assessed in the context of the maximum network bandwidth between a super-client and a backup replication server, the throughput achievable by the two computers, and the benefits of deduplication in reducing data transfer. Additionally, if any super-client is proscribed from replicating to a specific server, the cost for any configuration that would have it replicate there may be set to an arbitrary high value to ensure that such a configuration is never selected.

Figure 8:
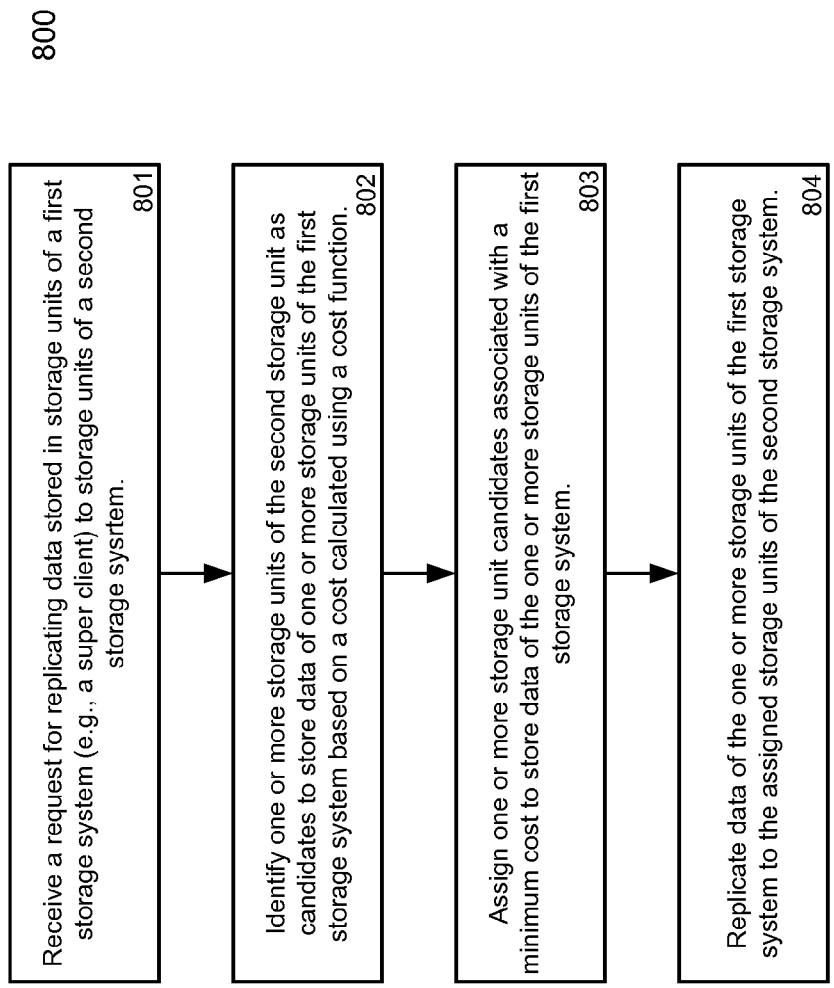
FIG. 8 is a flow diagram illustrating a method for replicating data of a storage system based on a cost calculated using a cost function according to one embodiment of the invention.

FIG. 8 is a flow diagram illustrating a method for replicating data of a storage system based on a cost calculated using a cost function according to one embodiment of the invention. Method 800 may be performed by a backup server or a management server as described above. Referring to FIG. 8, at block 801, a request for replicating data stored in storage units of a first storage system to storage units of a second storage system is received. The first storage system may be a smaller storage system (e.g., a local backup system) while the second storage system may be larger storage system (e.g., a centralized backup system). The second storage system is configured to store data replicated from multiple smaller backup storage systems.

At block 802, processing logic identifies one or more storage units of the second storage system as candidates to store data of one or more storage units of the first storage system based on a cost calculated using a cost function. The cost function may be similar to the one described above, where the cost function is configured to calculate a cost based on an amount of deduplicated data between data of the first storage system and data of the second storage system. The cost may also be calculated based on the available capacity and/or throughput of storage units of the second storage system in view of the capacity and/or throughput requirement of the storage units of the first storage system. The cost may also be calculated based on a measure of variations of capacity and/or throughput utilization amongst the storage units of the second storage system, etc., as described above. Operations involved in block 802 may be iteratively performed to identify the best storage unit candidates.

At block 803, one or more storage unit candidates associated with a minimum overall cost of the second storage system are selected and assigned for replicating data of one or more storage units of the first storage system. At block 804, data of the one or more storage units of the first storage system is replicated to the assigned storage units of the second storage system. In one embodiment, a storage unit of the first storage system having a higher bandwidth may be replicated first.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
receiving a request for allocating a storage unit of a storage system to back up data of one or more clients, the storage system having a plurality of storage units, each storage unit storing data that is deduplicated within each storage unit;
in response to the request, selecting one or more of the plurality of storage units based on an amount of deduplicated data that would be stored in each of the storage units after storing the data of the one or more clients, including
comparing fingerprints of the data of the one or more clients with fingerprints of at least a portion of data stored in each of the storage units, and
identifying a first of the storage units as a selection candidate that contains a significant fraction of fingerprints of one or more of the one or more clients from the storage units based on the comparison; and
allocating the selected one or more storage units to the one or more clients to back up the data of the one or more clients.

2. The method of claim 1, further comprising:
determining at least one of a storage capacity and throughput capacity for each of the storage units; and
identifying a second of the storage units as the selection candidate that contains less of the fingerprints of the one or more clients than the first storage unit, wherein the second storage unit has at least one of an available storage capacity and throughput capacity that is higher than the first storage unit.

3. The method of claim 1, wherein the amount of deduplicated data is determined based on an estimate of samples of data stored in the storage units and samples of data of the client.

4. The method of claim 1, wherein the amount of deduplicated data is estimated using at least one of a Bloom filtering method and a sort-merge method on fingerprints of at least a portion of data stored in the storage units.

5. The method of claim 1, wherein selecting one or more of the storage units comprises:
assigning the one or more clients to one or more of the storage units; and
computing a cost based on estimated capacity and throughput requirements of the storage units in view of the assigned storage units associated with the one or more clients and the overlap of clients stored on the same storage unit.

6. The method of claim 5, further comprising iteratively performing the assigning and the computing until the cost drops below a first predetermined threshold or a number of iterations exceed a second predetermined threshold.

7. The method of claim 5, wherein the cost is calculated based on a first measure of variation of a capacity utilization and a second measure of variation of a throughput utilization amongst the storage units.

8. The method of claim 7, wherein computing the cost further comprises:
performing one or more of following operations:
calculating a first penalty factor based on a capacity utilization of each storage unit,
calculating a second penalty factor based on a throughput utilization of each storage unit,
determining a fit penalty representing a number of clients whose data cannot be stored in each storage unit, and determining a data movement factor based on a movement weight representing a willingness of moving data of each storage unit; and determining the cost based on one or more of the first penalty factor, second penalty factor, fit penalty, and data movement factor of each of the storage units.

9. The method of claim 8, wherein calculating a first penalty factor based on a capacity utilization comprises computing the first penalty factor by applying a plurality of weights to the capacity utilization according to a plurality of capacity utilization thresholds in view of the capacity utilization.

10. The method of claim 8, wherein calculating a second penalty factor based on a throughput utilization comprises computing the second penalty factor by applying a plurality of weights to the throughput utilization according to a plurality of throughput utilization thresholds in view of the throughput utilization.

11. The method of claim 8, wherein computing the cost further comprises assigning an importance value to at least one of the one or more clients, wherein a fit penalty of a storage unit is determined based on the associated importance value of the at least one of the one or more clients.

12. The method of claim 5, further comprising:
periodically monitoring the capacity and throughput for each of the storage units; and
redistributing data stored in the storage units to another pool of storage units based on the monitored capacities and throughputs of the storage units.

13. A non-transitory machine-readable storage medium having instructions stored therein, which when executed by a processor, cause the processor to perform a method, the method comprising:
receiving a request for allocating a storage unit of a storage system to back up data of one or more clients, the storage system having a plurality of storage units, each storage unit storing data that is deduplicated within each storage unit;
in response to the request, selecting one or more of the plurality of storage units based on an amount of deduplicated data would be stored in each of the storage units after storing the data of the one or more clients, including
comparing fingerprints of the data of the one or more clients with fingerprints of at least a portion of data stored in each of the storage units, and
identifying a first of the storage units as a selection candidate that contains a significant fraction of fingerprints of one or more of the one or more clients from the storage units based on the comparison; and
allocating the selected one or more storage units to the one or more clients to back up the data of the one or more clients.

14. The non-transitory machine-readable storage medium of claim 13, wherein the method further comprises:
determining at least one of a storage capacity and throughput capacity for each of the storage units; and
identifying a second of the storage units as the selection candidate that contains less of the fingerprints of the one or more clients than the first storage unit, wherein the second storage unit has at least one of an available storage capacity and throughput capacity that is higher than the first storage unit.

15. The non-transitory machine-readable storage medium of claim 13, wherein the amount of deduplicated data is determined based on an estimate of samples of data stored in the storage units and samples of data of the client.

16. The non-transitory machine-readable storage medium of claim 13, wherein the amount of deduplicated data is estimated using at least one of a Bloom filtering method and a sort-merge method on fingerprints of at least a portion of data stored in the storage units.

17. A storage system, comprising:
a processor;
a plurality of storage units, each storage unit storing data that is deduplicated within each storage unit; and
a client assignment module executed by the processor, in response to a request for allocating a storage unit to back up data of one or more clients, to select one or more of the plurality of storage units based on an amount of deduplicated data that would be stored in each of the storage units after storing the data of the one or more clients and to allocate the selected one or more storage units to the one or more clients to back up the data of the one or more clients, wherein selecting one or more of the plurality of storage units comprises,
comparing fingerprints of the data of the one or more clients with fingerprints of at least a portion of data stored in each of the storage units, and
identifying a first of the storage units as a selection candidate that contains a significant fraction of fingerprints of one or more of the one or more clients from the storage units based on the comparison.

18. The system of claim 17, wherein the client assignment module is further configured to:
determine at least one of a storage capacity and throughput capacity for each of the storage units; and
identify a second of the storage units as the selection candidate that contains less of the fingerprints of the one or more clients than the first storage unit, wherein the second storage unit has at least one of an available storage capacity and throughput capacity that is higher than the first storage unit.

19. The system of claim 17, wherein the amount of deduplicated data is determined based on an estimate of samples of data stored in the storage units and samples of data of the client.

20. The system of claim 17, wherein the amount of deduplicated data is estimated using at least one of a Bloom filtering method and a sort-merge method on fingerprints of at least a portion of data stored in the storage units.

21. The non-transitory machine-readable storage medium of claim 13, wherein selecting one or more of the storage units comprises:
assigning the one or more clients to one or more of the storage units; and
computing a cost based on estimated capacity and throughput requirements of the storage units in view of the assigned storage units associated with the one or more clients and the overlap of clients stored on the same storage unit.

22. The non-transitory machine-readable storage medium of claim 21, wherein the method further comprises iteratively performing the assigning and the computing until the cost drops below a first predetermined threshold or a number of iterations exceed a second predetermined threshold.

23. The non-transitory machine-readable storage medium of claim 21, wherein the cost is calculated based on a first measure of variation of a capacity utilization and a second measure of variation of a throughput utilization amongst the storage units.

24. The non-transitory machine-readable storage medium of claim 23, wherein computing the cost further comprises: performing one or more of following operations:
- calculating a first penalty factor based on a capacity utilization of each storage unit,
- calculating a second penalty factor based on a throughput utilization of each storage unit,
- determining a fit penalty representing a number of clients whose data cannot be stored in each storage unit, and
- determining a data movement factor based on a movement weight representing a willingness of moving data of each storage unit; and
- determining the cost based on one or more of the first penalty factor, second penalty factor, fit penalty, and data movement factor of each of the storage units.

25. The non-transitory machine-readable storage medium of claim 24, wherein calculating a first penalty factor based on a capacity utilization comprises computing the first penalty factor by applying a plurality of weights to the capacity utilization according to a plurality of capacity utilization thresholds in view of the capacity utilization.

26. The non-transitory machine-readable storage medium of claim 24, wherein calculating a second penalty factor based on a throughput utilization comprises computing the second penalty factor by applying a plurality of weights to the throughput utilization according to a plurality of throughput utilization thresholds in view of the throughput utilization.

27. The non-transitory machine-readable storage medium of claim 24, wherein computing the cost further comprises assigning an importance value to at least one of the one or more clients, wherein a fit penalty of a storage unit is determined based on the associated importance value of the at least one of the one or more clients.

28. The non-transitory machine-readable storage medium of claim 21, wherein the method further comprises:
- periodically monitoring the capacity and throughput for each of the storage units; and
- redistributing data stored in the storage units to another pool of storage units based on the monitored capacities and throughputs of the storage units.

* * * * *